United States Patent [19]
Starnes, Jr.

[11] Patent Number: 5,346,383
[45] Date of Patent: Sep. 13, 1994

[54] LOW SHEAR FREE-FLOW EXTRUDER BREAKER PLATE

[75] Inventor: Ralph E. Starnes, Jr., Carroll County, Ga.

[73] Assignee: Southwire Company, Carrollton, Ga.

[21] Appl. No.: 187,990

[22] Filed: Jan. 28, 1994

[51] Int. Cl.⁵ .................. B29B 7/42; B29B 7/74; B29C 47/68
[52] U.S. Cl. .................. 425/197; 425/382.4
[58] Field of Search .......... 425/197, 198, 199, 382.4, 425/DIG. 37, 176

[56] References Cited

U.S. PATENT DOCUMENTS

| | | | |
|---|---|---|---|
| 2,895,167 | 7/1959 | Paggi | 425/197 |
| 2,990,576 | 7/1961 | Piper | 425/197 |
| 3,077,636 | 2/1963 | Peters | 425/197 |
| 3,121,255 | 2/1964 | Henning et al. | 425/198 |
| 3,938,925 | 2/1976 | Lees | 425/198 |
| 3,954,365 | 5/1976 | Barth et al. | 425/197 |
| 5,141,631 | 8/1992 | Whitman | 425/195 |

FOREIGN PATENT DOCUMENTS 0153197 12/1981 Fed. Rep. of Germany ...... 425/197

4-300309 10/1992 Japan ...................... 425/197

Primary Examiner—Khanh Nguyen
Attorney, Agent, or Firm—James W. Wallis, Jr.; Stanley L. Tate; George C. Myers, Jr.

[57] ABSTRACT

An extruder device having improved flow distribution, reduced shear and reduced surface area on which material can accumulate, including a breaker plate having a plurality of symmetrically arranged tapered holes provided therein. The holes are disposed on a series of V-shaped concentric centering grooves the diameters of which progressively increase, albeit by diminishing increments, over the adjacent inner circles. Each of the holes disposed on a particular centering groove is of equal diameter; however, the diameters of the holes become progressively smaller as the diameters of the centering grooves on which they are disposed increase. The holes nearest the center of the plate have the largest diameters, while those nearest the periphery of the plate have the smallest diameters. A compact symmetrical array of holes is provided, with the holes cooperating with the centering grooves to present a knife-like edge to the plastic material, with the interstitial spaces between the holes being inclined toward the holes.

14 Claims, 2 Drawing Sheets

LOW SHEAR FREE-FLOW EXTRUDER BREAKER PLATE

FIELD OF THE INVENTION

This invention relates to apparatus for extruding plastic insulating material onto a moving wire. More specifically, the invention relates to an apparatus for extruding insulation material which includes a breaker plate of improved design to be interposed between a screw which delivers the plastic insulating material and a crosshead device which applies the insulating material onto the wire.

BACKGROUND OF THE INVENTION

In applying plastic insulating material to a wire to be insulated, the plastic material is delivered to a crosshead device which applies the insulating material to the wire by means of an extruder. The extruder includes a screw which forces the plastic material against a breaker plate having a plurality of holes therein. The plastic material is extruded through the holes in the breaker plate into a conduit or adapter through which the plastic flows into the crosshead device. The breaker plate functions to create a back pressure in the extruder and to shear the plastic material as it passes therethrough.

An extruder having a prior art breaker plate is disclosed in U.S. Pat. No. 3,121,255. The prior art breaker plates typically comprised a flat disc having a number of holes of equal diameter, with each hole having a constant diameter along its length. The consequence of this configuration is that there are a number of flat surfaces between the holes on the side of the breaker plate facing the screw. These flat surfaces provide "dead spots" on which the plastic insulating material tends to accumulate, decompose with time and temperature, and eventually smolder or burn. This degraded material is ultimately passed through the breaker plate with the plastic flow and contaminates the insulating layer applied by the crosshead. In addition, these prior art breaker plates impart a relatively high shear force to the plastic material which is detrimental to certain shear sensitive plastics, such as polyvinylchloride (PVC), polybutylterephthalate (PBT), and vulcanized insulated polypropylene (VIP). Because the holes are of uniform diameter and profile, there is a tendency for a greater volume of the plastic material to flow through the radially outermost portions of the breaker plate than the radially inner portions because the aggregate hole surface area is greater in the outermost portions than in the inner portions. This results in an uneven flow distribution into the crosshead which can affect the uniformity of the insulation layer applied to the wire.

Moreover, the uneven flow distribution through the breaker plate adversely affects the efficiency of the system since the buildup of degraded material requires more frequent cleaning of the breaker plate, thereby limiting the effective production cycle between cleanings. In addition, as mentioned above, the relatively high shear forces presented by the dead spaces on the breaker plate and the constant diameter holes pose a potential detrimental effect on certain shear-sensitive plastics.

SUMMARY OF THE INVENTION

The present invention is directed to an extruder device having improved flow distribution, reduced shear and reduced surface area on which material can accumulate. A preferred embodiment of the present invention comprises a breaker plate having a plurality of symmetrically arranged tapered holes provided therein. The holes are tapered so as to have a greater diameter at their upstream ends (facing the extruder screw) than at their downstream ends (facing the crosshead). The holes are disposed on a series of concentric V-shaped concave circular centering grooves, the diameters of which progressively increase, albeit by diminishing increments, over the adjacent inner circular groove. In other words, the V-shaped concave circular centering grooves are arranged such that adjacent grooves in the series become progressively closer to one another as their diameters increase. Each of the holes disposed on a particular centering groove is of equal diameter. However, because the centering grooves become closer to one another as their diameters increase, the diameters of the holes become progressively smaller as the diameters of the centering grooves on which they are disposed increase. The result of this arrangement is that the holes nearest the center of the plate have the largest diameters, while those nearest the periphery of the plate have the smallest diameters. The V-shaped grooves form alternating concentric "ridges" and "valleys," with the holes centered on the valleys. As a consequence, a compact symmetrical array of holes is provided, with each centering groove and the grooves adjacent thereto presenting a knife-like edge to the plastic material, with the spaces between the holes being concave and slanting generally in the direction of flow.

The flow is balanced and centralized by the progressive increase in hole size in the direction toward the center of the breaker plate. The shape of the surfaces between the holes minimizes the buildup of plastic material on the breaker plate. This configuration, along with the tapered holes, also results in reduced shear of the plastic which minimizes degradation of shear-sensitive materials. Thus, longer production runs can be achieved before shutdown is required to service the extruder.

With the foregoing and other advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE INVENTION

Figure 1:
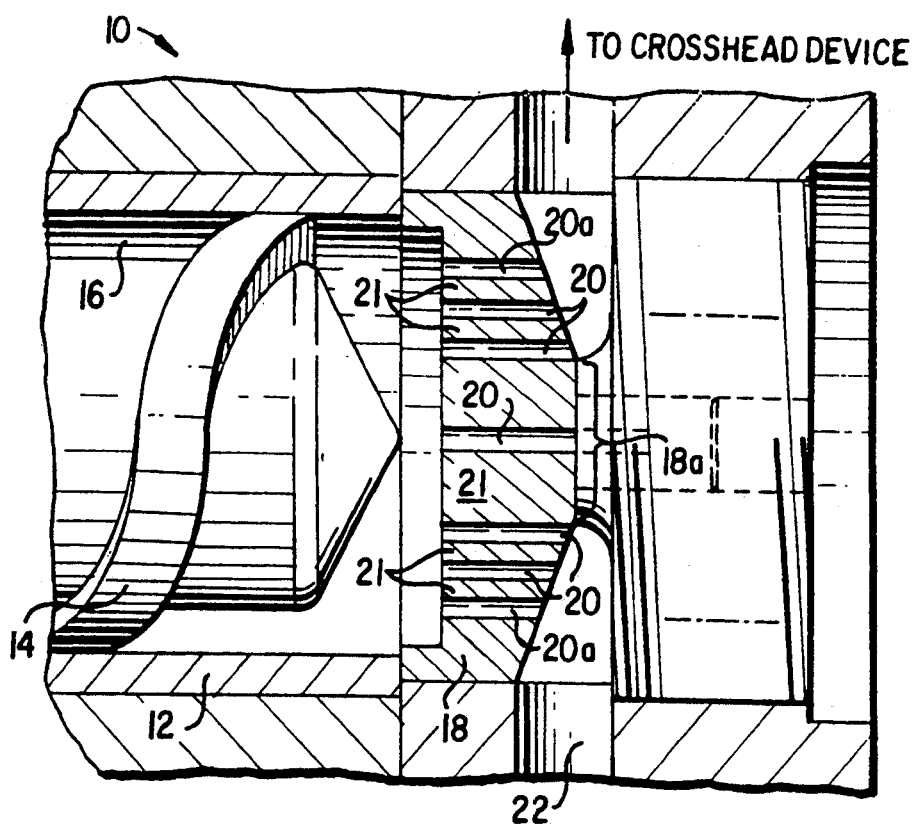
FIG. 1 is a fragmentary sectional view of an extruder device including a breaker plate having untapered holes therein, according to the prior art.

Referring now to the drawings in detail, there is illustrated in FIG. 1 a prior art breaker plate mounted in an extruder device. As shown in FIG. 1, an extruder device, generally designated by the numeral 10, includes a barrel 12 in which a screw 14 is disposed. An annular space or channel 16 is provided between the screw 14 and the wall of the barrel 12. Disposed downstream of the screw 14 is a breaker plate 18 having a plurality of straight or untapered holes 20 formed therein. Downstream of the breaker plate 18 is a conduit 22 which feeds a crosshead device (not shown) through which a wire (also not shown) is passed in order that insulating material can be applied thereto. As shown in FIG. 1, the breaker plate 18 is subject to undesirable flow distribution and accumulation of insulating material thereon, as described above.

As shown in FIG. 1, a typical prior art breaker plate 18 is disc-like in shape. The plurality of holes 20 provided in the prior art breaker plate 18 are uniform in diameter and are untapered. The consequence of this configuration is that flat stagnation points or dead spaces 21 exist between the holes 20. The flat spaces are essentially perpendicular to the direction of extrusion, with the result that these dead spaces 21 are potential sites for buildup of material to be extruded. In addition, because of the mating of the screw 14 and channel 16 with breaker plate 18, the flow of plastic material is directed outward toward the outer portions of breaker plate 18, through the outer holes 20a therein. Thus, the central portion 18a of breaker plate 18 has reduced flow. The straight untapered holes 20 also result in high shear of the plastic material being extruded.

Figure 2:
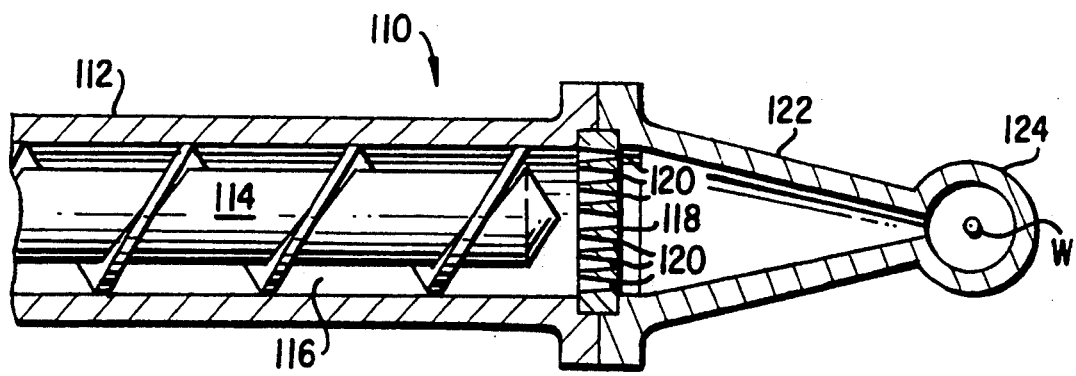
FIG. 2 is a fragmentary sectional view of an extruder device including a breaker plate having V-shaped concave centering grooves and tapered holes formed therein, according to the present invention.

FIG. 2 illustrates a breaker plate 118, according to the present invention, mounted in an extruder device. As shown in FIG. 2, an extruder device, generally designated by the numeral 110, includes a barrel 112 in which a screw 114 is disposed. An annular space or channel 116 is provided between the screw 114 and the wall of the barrel 112, similar to that in FIG. 1. Disposed downstream of the screw 114 is the breaker plate 118 having a plurality of tapered holes 120 formed therein on a plurality of concentric V-shaped concave centering grooves (not shown), in accordance with the present invention. Downstream of breaker plate 118 is a conduit or adapter 122 which feeds a crosshead device 124 through which an advancing wire W is passed in order that insulating material can be applied thereto.

In operation, plastic is delivered to the screw 114 and is forced down the channel 116 to the breaker plate 118. There the plastic is extruded through the holes 120 into the adapter 122 and into the crosshead 124, where it is applied to the advancing wire W.

Figure 3:
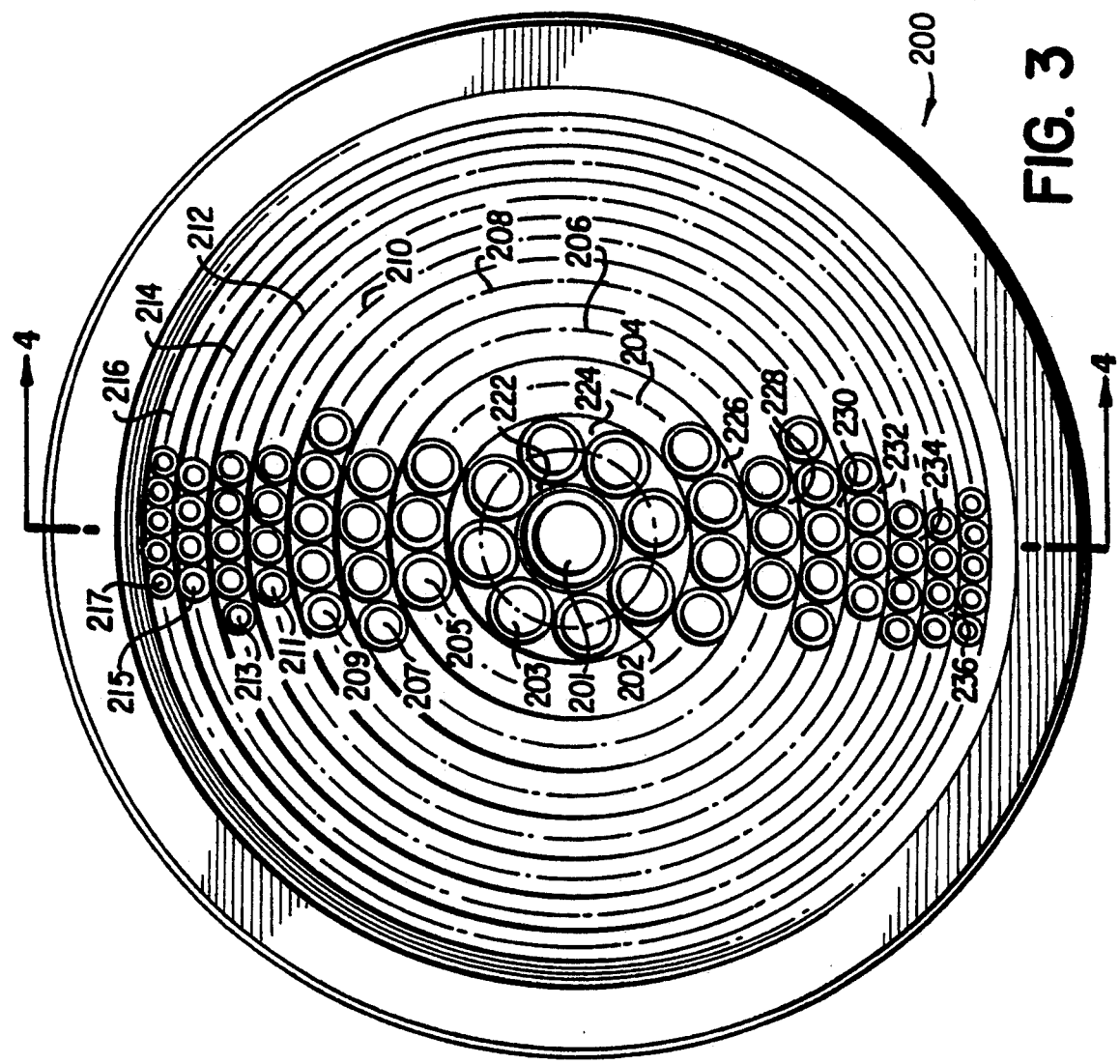
FIG. 3 is a plan view of a breaker plate according to the present invention.
Figure 4:
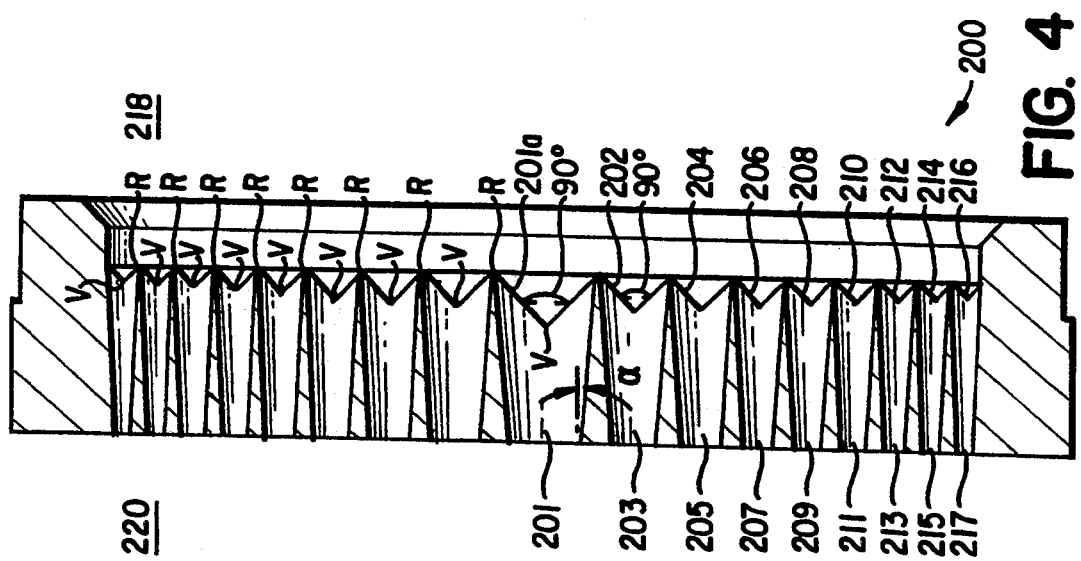
FIG. 4 is a sectional view taken along line 4—4 of FIG. 3, and illustrates the V-shaped concave circular centering grooves and tapered holes in the breaker plate.

FIGS. 3 and 4 show a breaker plate, designated generally by the numeral 200, according to the present invention. As shown in FIGS. 3 and 4, a plurality of concentric V-shaped concave centering grooves 202, 204, 206, 208, 210, 212, 214, 216 are provided having diameters which increase in the direction radially outward from the center 201 of breaker plate 200. Each centering groove has a plurality of holes 203, 205, 207, 209, 211, 213, 215, 217, centered on and arranged circumferentially around the respective corresponding centering groove to thereby form a ring of holes.

Each of these holes tapers from a larger diameter to a smaller diameter in the direction from the upstream side 218 facing the extruder screw to the downstream side 220 leading to the crosshead device. As shown in FIG. 3, each hole on a centering groove touches the other holes on the same centering groove tangentially. In addition, the holes on adjacent centering grooves are arranged to be in close proximity to each other, thereby limiting the spaces on the breaker plate 200 between holes. As explained below, this results in a knife-like edge being presented to the plastic on the upstream or inlet side of breaker plate 200.

The close spacing of holes combined with the V-shaped centering grooves, as shown in FIG. 3, results in reduced or minimized accumulation of plastic insulating material on the spaces 222, 224, 226, 228, 230, 232, 234, 236 between the holes. The variation in hole size, as shown, results in equalization of pressure across the breaker plate 200 and a more uniform flow distribution through the holes. The tapered holes reduce the shear on the plastic flowing through breaker plate 200, thereby reducing the degradation of shear-sensitive insulating materials.

The V-shaped centering grooves and holes are formed in the breaker plate 200, as follows:

A conical depression 201a (shown in phantom because it is ultimately bored or reamed out) is made at the center of the breaker plate 200. The apex of the conical depression is formed at essentially a right angle (although other angles could be formed). The outer diameter of the conical depression 201a corresponds to the outer diameter (upstream diameter) of tapered hole 201 which is bored or reamed in the breaker plate 200. This outer diameter of depression 201a or hole 201 forms the inner diameter of a V-shaped centering groove 202 which is then cut into the breaker plate 200. The centering groove 202 width corresponds to the upstream diameter of the tapered holes 203 which are to be bored or reamed in groove 202. The depth of the centering groove 202 is determined by the maximum depth of cut permissible to form an essentially right angle V-shaped groove corresponding to the chosen diameter of hole 203. As a consequence, a plurality of concentric V-shaped grooves are cut in breaker plate 200. The V-shaped grooves are essentially right angle grooves with the groove widths and groove depths decreasing as the grooves are cut in each radially outward increment.

The V-shaped grooves result in a series of alternating concentric ridges R and valleys V on the surface of breaker plate 200. Once the centering grooves have been cut, then the tapered holes are bored or reamed in each centering groove. The holes are centered on the valleys of the centering grooves. The width of each centering groove determines the upstream diameter of each tapered hole. Once all of the centering grooves and corresponding tapered holes are formed in the breaker plate 200, the upstream surface which is presented to the extrudate is one of knife-like ridges and holes which have valleys at the points of tangency. The interstitial spaces between holes are all slanted away from a ridge toward a valley. Thus, no surfaces which are perpendicular to the direction of flow of the extrudate are presented on the upstream side 218 of the breaker plate 200.

The amount of taper (shown as angle $\alpha$, FIG. 4) for the holes in each successive concentric ring of holes varies due to the change in diameter of the holes. Center hole 201 may preferably have a taper of approximately 4.6° with holes 217 having a taper of approximately 2.0°. The remaining holes have tapers which are within this range but which decrease for each ring in the radially outward direction.

As will be seen in FIG. 3, the spacing between centering grooves (the increment in centering groove diameters) is one-half of the diameter (the radius) of the holes on the centering groove plus one-half of the diameter (the radius) of the holes on the adjacent inner centering groove. Thus, the hole diameters and the centering groove diameters are inversely related.

The breaker plate according to the present invention is made from materials known in the art to be suitable for use in insulation extrusion. Typically, stainless steel or tool steel are acceptable materials.

Although a certain presently preferred embodiment of the invention has been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A breaker plate for an extruder device, comprising:
   a plate having a center, an upstream side adapted to receive a material to be extruded, and a downstream side to which the material is to be extruded;
   a plurality of concentric centering grooves formed in said plate, and
   a plurality of holes of varying diameters formed in said centering grooves and arranged so as to minimize spacing between said holes.

2. A breaker plate as in claim 1, wherein said centering grooves are V-shaped and are arranged essentially concentrically in increasing diameters, and the diameters of said holes are inversely related to the diameters of said centering grooves.

3. A breaker plate as in claim 1, wherein said holes are tapered.

4. A breaker plate as in claim 3, wherein said holes are tapered so as to decrease in diameter from said upstream side to said downstream side.

5. A breaker plate as in claim 1, wherein said centering grooves present a series of alternating knife-like ridges and valleys on said upstream side.

6. A breaker plate as in claim 2, wherein said holes on a centering groove are tangentially touching adjacent holes on said centering groove so as to present a knife-like edge to material being extruded therethrough.

7. A breaker plate as in claim 3, wherein said tapered holes have a range of taper from approximately 4.6 degrees for a center hole to approximately 2.0 degrees for a radially outermost hole.

8. An extruder device comprising:
   a barrel,
   a screw disposed in said barrel so as to form an annular channel in said barrel,
   a breaker plate disposed at an end of said barrel downstream of said screw, and
   a conduit disposed downstream of said breaker plate for feeding extruded material to a crosshead device for applying insulation to an advancing wire;
   wherein said breaker plate comprises:
   a plate having an upstream side adapted to receive a material to be extruded and a downstream side to which the material is to be extruded, a plurality of concentric grooves are formed in said plate and
   a plurality of holes of varying diameters formed in said grooves and arranged so as to minimize spacing between said holes.

9. An extruder device as in claim 8, wherein said grooves are V-shaped, said centering grooves arranged essentially concentrically in increasing diameters, and the diameters of said holes are inversely related to the diameters of said centering grooves.

10. An extruder device as in claim 9, wherein said holes are tapered.

11. An extruder device as in claim 10, wherein said holes are tapered so as to decrease in diameter from said upstream side to said downstream side.

12. An extruder device as in claim 9, wherein said holes on a centering groove are tangentially touching.

13. An extruder device as in claim 9, wherein said centering grooves present a series of alternating knife-like ridges and valleys on said upstream side.

14. An extruder device as in claim 10, wherein said tapered holes have a range of taper from approximately 4.6 degrees for a center hole to approximately 2.0 degrees for a radially outermost hole.

* * * * *